No. 823,658. PATENTED JUNE 19, 1906.
R. W. WILSON & F. G. D. JOHNSTON.
VARIABLE SPEED GEAR.
APPLICATION FILED DEC. 9, 1905.

2 SHEETS—SHEET 1.

No. 823,658. PATENTED JUNE 19, 1906.
R. W. WILSON & F. G. D. JOHNSTON.
VARIABLE SPEED GEAR.
APPLICATION FILED DEC. 9, 1905.

2 SHEETS—SHEET 2.

Witnesses.
Inventors.

UNITED STATES PATENT OFFICE.

REGINALD WELLESLEY WILSON AND FRANCIS GAWEN DILLON JOHNSTON, OF NEWCASTLE-UPON-TYNE, ENGLAND.

VARIABLE-SPEED GEAR.

No. 823,658.  Specification of Letters Patent.  Patented June 19, 1906.

Application filed December 9, 1905. Serial No. 291,055.

*To all whom it may concern:*

Be it known that we, REGINALD WELLESLEY WILSON and FRANCIS GAWEN DILLON JOHNSTON, subjects of the King of Great Britain, residing at 10 Bentinck Crescent, Newcastle-on-Tyne, England, have invented certain new and useful Variable-Speed Gear, of which the following is a specification.

This invention relates to improvements in variable-speed gear of the epicyclic type, such as is suitable for bicycles, tricycles, motor-cars, and other machines; and its object is to provide a gear giving three forward speeds and a reverse, the parts being all contained within a hub of the type in common use with a motor-propelled cycle.

The drive is transmitted by means of pawls which engage with ratchet-teeth cut on the faces of the planet-cage and of the internally-toothed ring gearing with the planets, and means are provided for suppressing the action of one or more of the pawls to alter the gear. The reverse speed is obtained by a sliding ring of teeth engaging a reverse-pawl.

Figure 1:
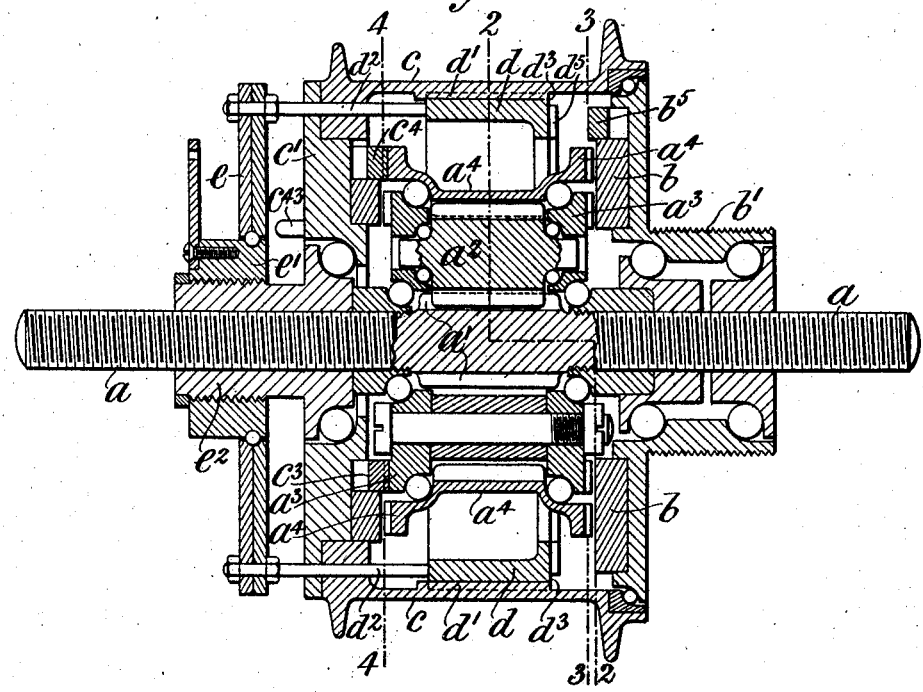
Figure 2:
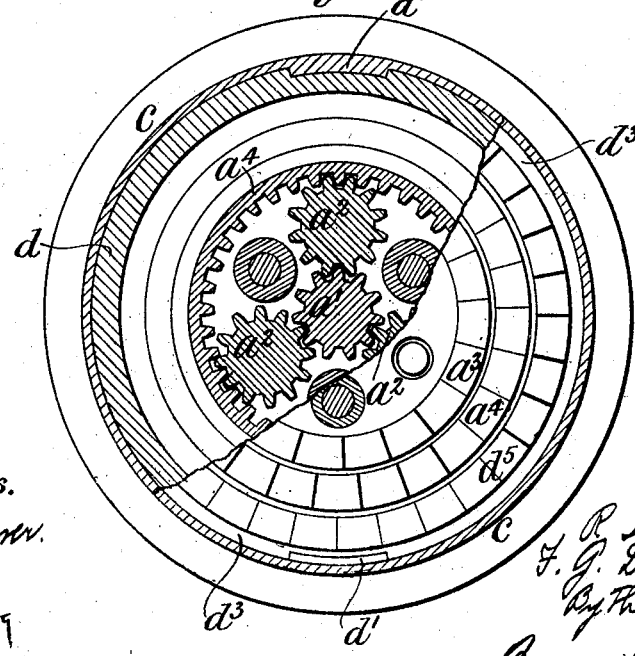
Figure 3:
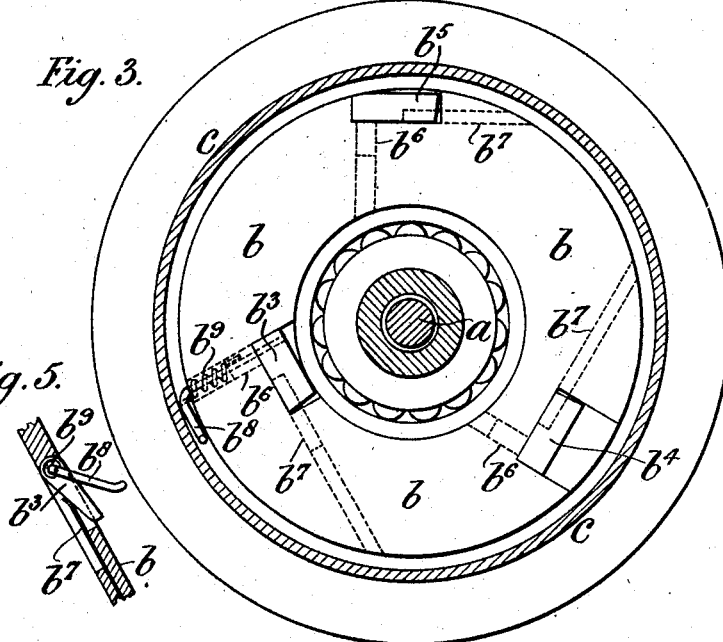
Figure 5:
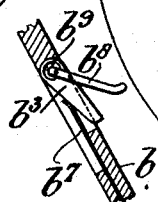
Figure 6:
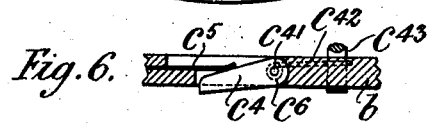
Figure 4:
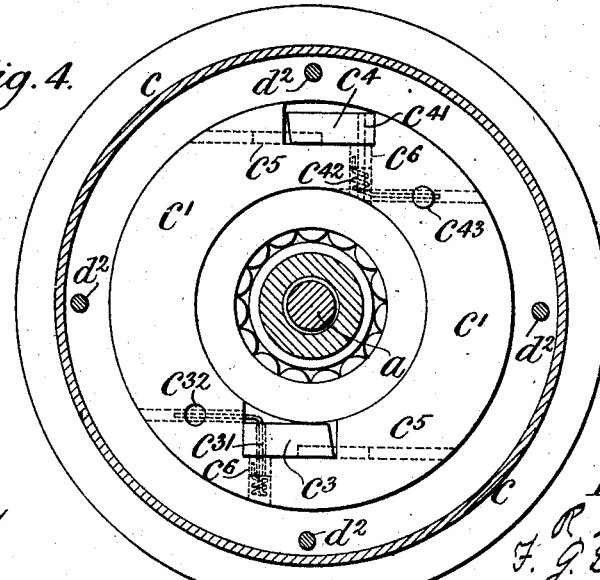
Figure 7:
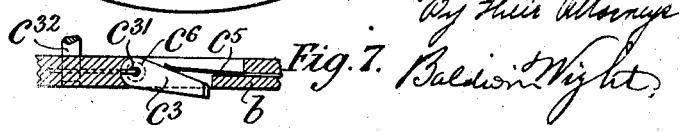

Figure 1 of the drawings is a longitudinal section; Fig. 2, a section on the line 2 2, Fig. 1, looking from right to left. Fig. 3 is a section on the line 3 3 looking to the right; Fig. 4, a section on the line 4 4 looking to the left, and Figs. 5, 6, and 7 show details of the pawls.

$a$ is the axle, having on it the pinion $a'$, meshing with planet-pinions $a^2$, carried by a planet-cage $a^3$ and meshing with internal teeth on the ring $a^4$.

The sprocket-wheel or other externally-rotated member—i. e., the driving member of the gear—is fast with a disk $b$, to which it is secured by the boss $b'$. The disk is furnished with three pawls—the first, $b^3$, engaging teeth on the planet-cage $a^3$, the second, $b^4$, engaging teeth on the ring $a^4$, while the third, $b^5$, is a reverse-pawl. The inside face of the disk $b$ is seen in Fig. 3 with the three pawls $b^3$, $b^4$, and $b^5$. These pawls are situated in recesses on the disk and can turn on trunnions $b^6$, being pressed out from the face of the disk by blade-springs $b^7$. Passing through a hole in the trunnion of the pawl $b^3$ is a bent finger $b^8$, (see Fig. 5,) projecting out some way from the disk, and a spring $b^9$ is coiled round the finger, as shown, one end being secured to the trunnion. The outer end of the finger can be acted on, as described below, to withdraw the pawl $b^3$ from engagement with the cage $a^3$. The hub $c$ carries the driven member of the gear—viz., a disk $c'$, situated on the other side of the gear and furnished with two pawls, the first, $c^4$, engaging a second ring of teeth on the internally-toothed ring $a^4$ and the second, $c^3$, engaging a second ring of teeth on the planet-cage $a^3$. This disk is seen in Fig. 4 with the pawls $c^4$ and $c^3$ actuated by springs $c^5$ and turning on trunnions $c^6$. Fig. 6 is a separate view of the pawl $c^4$. This has a rod $c^{41}$ passing through it, round which is wound a spring $c^{42}$, having one end secured to the trunnion, while its outer end passes along a slot in the disk and through a finger $c^{43}$. The pawl $c^3$ (see Fig. 7) has a spring $c^{31}$ passing through it, one end being secured to the trunnion and the other passing along a slot in the disk and through a finger $c^{32}$. These fingers $c^{43}$ and $c^{32}$ can both be operated to withdraw the pawls from engagement, as described below.

Inside the hub is a ring $d$, which can be slid along guides $d'$, parallel to the axis, to disengage or throw out of action the first pawl $b^3$ on the driving-disk, and has also a ring of teeth $d^5$ upon it to engage the reverse-pawl $b^5$. The ring $d$ is connected by rods $d^2$ to a disk $e$, carried by a nut $e'$, moving on a quick screw-thread formed on a bush $e^2$ on the axle.

For the high speed the drive takes place from the driving-disk $b$, through the first set of pawls $b^3$, to the cage $a^3$, the planets $a^2$, the ring $a^4$, the driven pawl $c^4$, and the hub $c$, both the pawls $b^4$ and $c^3$ being overrun.

For the intermediate speed the nut $e'$ is moved in toward the gear, so that the face $d^3$ of the sliding ring $d$ disengages the driving-pawl $b^3$ from the teeth on the cage $a^3$ by pressing on the finger $b^8$, so that the drive now takes place from the driving-disk $b$, through the pawl $b^4$, to the ring $a^4$, the driven pawl $c^4$, and the hub $c$, the planets $a^2$ revolving idly and the pawl $c^3$ being overrun.

For the low speed the nut $e'$ is moved farther in, so that the driven pawl $c^4$ is disengaged, owing to the disk $e$ pressing on the finger $c^{43}$, and the drive takes place from the disk $b$, through the driving-pawl $b^4$, to the ring $a^4$, the planets $a^2$, the cage $a^3$, the second driven pawl $c^3$, and the hub $c$. If the nut is moved still farther in, the pawl $c^3$ is disengaged, owing to the disk $e$ pressing on the finger $c^{32}$, and the teeth $d^5$ on the sliding ring $d$ engage the reverse-pawl $b^5$ on the driving-disk $b$, which can now no longer drive forward, but is driven by the hub, which provides a means of starting the motor by utilizing the movement of the vehicle when the gear is fitted to a motor-driven vehicle, or it allows of the motor being started by a handle or other means with the vehicle standing, as no forward drive can now be transmitted to the road-wheels.

What we claim is—

1. In a variable-speed gear, the combination of a driving member, an epicyclic gear, a driven member, means for connecting and disconnecting the driving and driven members to and from the epicyclic gear, and reverse means for directly connecting the driving and driven members, substantially as described.

2. In a variable-speed gear, the combination of a driving member, an epicyclic gear, a driven member, means for connecting and disconnecting the driving and driven members to and from the epicyclic gear, a pawl on the driving member, and a ring of teeth on the driven member capable of engaging the pawl, substantially as described.

3. In a variable-speed gear, the combination of a driving member, two pawls upon its face, an epicyclic gear, there being ratchet-teeth upon both faces of the planet-cage and also upon both faces of the ring engaging the planets, a driven member, two pawls upon its face, and means for withdrawing either one, two or three pawls from the paths of the ratchet-teeth, substantially as described.

4. In a variable-speed gear, the combination of a driving member, two forward pawls and one reverse-pawl upon its face, an epicyclic gear, there being ratchet-teeth upon both faces of the planet-cage and also upon both faces of the ring engaging the planets, a driven member, two pawls upon its face, means for withdrawing either one, two or three pawls from the paths of the ratchet-teeth, a ring of teeth carried by the driven member, and means for sliding this ring into engagement with the reverse-pawl, substantially as described.

5. In a variable-speed gear, the combination of a driving member, an epicyclic gear, there being ratchet-teeth upon both faces of the planet-cage and also upon both faces of the ring engaging the planets, three pawls on the driving member, the first engaging teeth on the cage, the second engaging teeth on the ring, and the third a reverse-pawl, a driven member, two pawls upon it, a ring carried by the driven member and adapted to withdraw the first-mentioned pawl, teeth upon the ring adapted to engage the reverse-pawl, and means for moving the ring longitudinally, substantially as described.

6. In a variable-speed gear, the combination of a driving member, an epicyclic gear, there being ratchet-teeth upon both faces of the planet-cage and also upon both faces of the ring engaging the planets, three pawls on the driving member, the first engaging teeth on the cage, the second engaging teeth on the ring, and the third a reverse-pawl, a driven member, two pawls upon it, a ring carried by the driven member and adapted to withdraw the first-mentioned pawl, there being teeth upon the ring adapted to engage the reverse-pawl, a disk connected to the ring and adapted to withdraw the two pawls on the driven member, and means for moving the disk longitudinally, substantially as described.

REGINALD WELLESLEY WILSON.
FRANCIS GAWEN DILLON JOHNSTON.

Witnesses:
H. O. COLBECH,
F. BERNARD.